United States Patent
Adur et al.

Patent Number: 5,968,647
Date of Patent: Oct. 19, 1999

[54] ENHANCED ETHYLENE METHYL ACRYLATE ADHESIVE TIE MATERIAL FOR POLYESTER PAPERBOARD OVENABLE CONTAINER

[75] Inventors: Ashok M. Adur, Ramsey, N.J.; Thomas Z. Fu, Croton; Jongsoo Lee, Pittsford, both of N.Y.

[73] Assignee: International Paper Company, Tuxedo Park, N.Y.

[21] Appl. No.: 08/942,542

[22] Filed: Oct. 1, 1997

[51] Int. Cl.[6] .................................................. B32B 27/10
[52] U.S. Cl. ........................ 428/341; 428/481; 428/483; 428/511; 428/34.2; 428/34.5
[58] Field of Search .................. 428/34.2, 34.5, 428/35.7, 481, 483, 511, 339, 219, 341; 229/5.84

[56] References Cited

U.S. PATENT DOCUMENTS

| | | |
|---|---|---|
| Re. 32,270 | 10/1986 | Murray, Jr. ................................ 70/150 |
| 3,904,104 | 9/1975 | Kane ....................................... 209/584 |
| 3,939,025 | 2/1976 | Kane ................................... 156/224.23 |
| 3,967,998 | 7/1976 | Kane ......................................... 156/226 |
| 4,387,126 | 6/1983 | Rebholz ................................. 428/34.3 |
| 4,391,833 | 7/1983 | Self et al. ............................... 426/523 |
| 4,455,184 | 6/1984 | Thompson ........................... 156/244.4 |
| 4,469,258 | 9/1984 | Wright et al. ............................. 229/43 |
| 4,573,832 | 3/1986 | Zinner ....................................... 407/70 |
| 4,595,611 | 6/1986 | Quick et al. ........................... 428/34.2 |
| 4,698,246 | 10/1987 | Gibbons et al. ........................ 428/34.2 |
| 4,740,377 | 4/1988 | Dawes et al. ............................ 426/234 |
| 4,765,999 | 8/1988 | Winter ..................................... 426/113 |
| 4,806,398 | 2/1989 | Martin, Jr. ............................. 428/34.2 |
| 4,900,594 | 2/1990 | Quick et al. ........................... 428/34.2 |
| 4,925,684 | 5/1990 | Simon ..................................... 426/107 |
| 5,498,452 | 3/1996 | Powers ................................... 428/34.2 |
| 5,534,575 | 7/1996 | Foster et al. ............................ 524/270 |
| 5,772,331 | 6/1998 | Irace et al. ................................ 383/90 |

*Primary Examiner*—Rena L. Dye
*Attorney, Agent, or Firm*—Hoffman Wasson & Gitler

[57] ABSTRACT

A laminate structure for containers produced using an unique extrudable adhesive tie layer which incorporates an antioxidant material. The antioxidant additive provides for the necessary and superior high temperature end-uses and stability of containers made therefrom.

12 Claims, 1 Drawing Sheet

ENHANCED ETHYLENE METHYL ACRYLATE ADHESIVE TIE MATERIAL FOR POLYESTER PAPERBOARD OVENABLE CONTAINER

BACKGROUND OF THE INVENTION

The invention addresses a polymer coated paperboard which can be utilized for dual ovenable applications. The polymer coating contains a product contact layer of a polyethylene terephthalate polyester. The structures make use of an adhesive tie layer which contains ethylene-methyl acrylate and an essential antioxidant component.

In the past, dual ovenable containers have been constructed from a laminate containing paperboard, a tie layer made from ethylene-methyl acrylate (EMA), ethylene-vinyl acetate copolymers, acrylic acid copolymers, physical blends of polyethylene with about 20% polyethylene terephthalate (PET) or physical blends of ethylene-methyl acrylate with polyethylene terephthalate. See U.S. Pat. No. 4,455,184.

The adhesive tie material of the present invention is neither discussed nor suggested by the '184 patent. The tie material used in the '184 patent fails cooking tests as compared directly to adhesive tie layers of ethylene-methyl acrylate containing an antioxidant. This unique additive allows the container produced to exhibit the necessary and superior cooking performance. The superior materials and resultant structures allow for coating weights of the polyester to be below 25 lbs/3,000 sq. ft., something not previously successfully practical in a conventional polyethylene terephthalate structure. Weights below 25 lbs/3,000 sq. ft. of polyethylene terephthalate exhibited poor adhesion to the paperboard substrate, in addition to deleterious pinholes formed therein. Reduction of the coating weights of the product contact layer provided significant economic savings in production of the structure.

It is an object of the present invention to produce a coating for contact with a product in a dual ovenable container that is less costly than conventional polyethylene terephthalate structures using ethylene-methyl acrylate and an essential antioxidant component and further maintains product quality.

It is a further object of the present invention that reduces coating neck-in during extrusion coating and therefor high trimming and waste.

It is yet a further object of the present invention to increase adhesion of the product contact layer coating to paperboard.

Another object of the present invention is to increase flexibility of the coating structure.

Another object of the present invention is to increase coating line speed without causing detrimental effect on the quality of products being produced.

Yet another object of the present invention is the production of high temperature cooking coated paper containers.

SUMMARY OF THE INVENTION

The invention covers structures of coated paperboard for packaging applications and methods of producing and using them. The structure is made from a laminate having a paperboard substrate, an unique adhesive tie layer containing ethylene-methyl acrylate and an antioxidant and/or inorganic filler, and a product contact layer of polyethylene terephthalate.

DETAILED DESCRIPTION OF THE PREFERRED EMBODIMENTS

Figure 1:
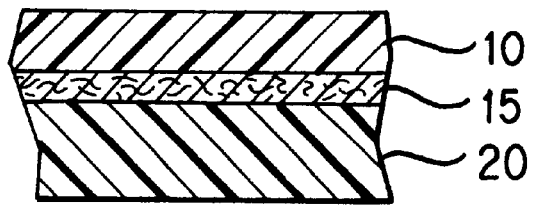
FIG. 1 is a cross-section of a laminate embodying the present invention.
Figure 2:
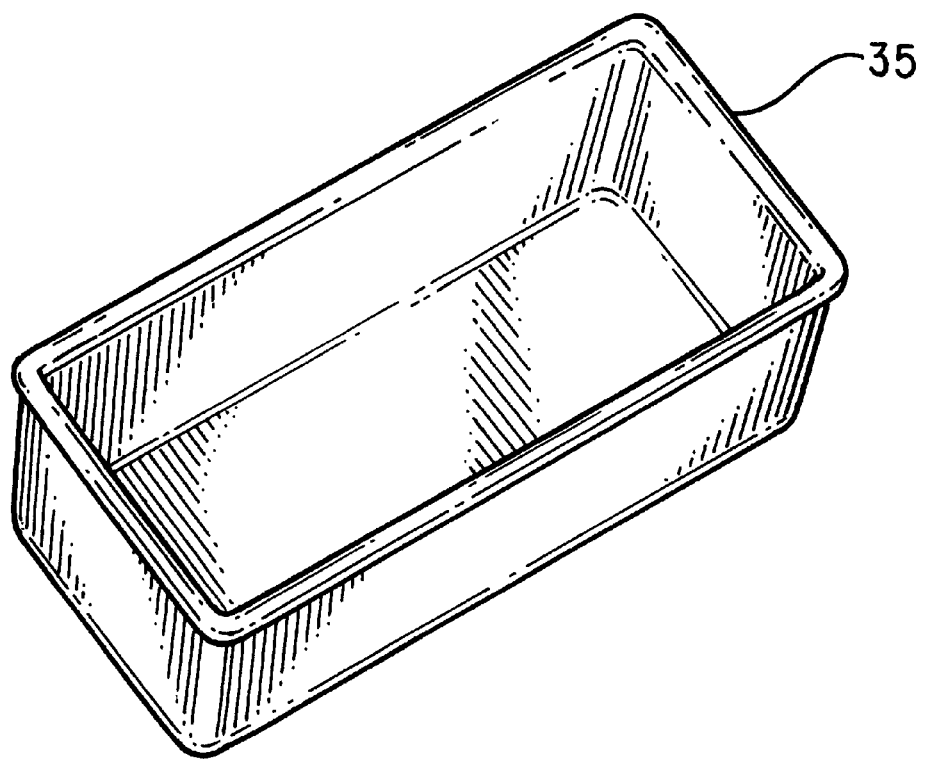
FIG. 2 is a perspective view of one type of container formed from the laminate of the present invention.

The inventive structure is depicted in cross-section in FIG. 1. A product contact coating 10 of a polyethylene terephthalate polyester material is extruded onto or coextruded with an unique adhesive tie layer 15 of ethylene-methyl acrylate having an antioxidant incorporated therein of a paperboard substrate 20. The product contact layer has a coating weight ranging from 4–35 lbs/3,000 sq. ft., although it is preferred to have a coating weight of 10–12 lbs/3,000 sq. ft. The extruded or coextruded unique tie layer has a coating weight ranging from 1–30 lbs/3,000 sq. ft. with a preferred weight range being from 3–6 lbs/3,000 sq. ft. If desired, prior to extrusion the paperboard surface is treated by on-line flame treatment or corona treatment to enhance tie layer adhesion to board.

The extrudable tie layer contains ethylene-methyl acrylate and an antioxidant additive, preferably a hindered phenol such as 3,5-bis(1,1-Dimethylethyl)-4-hydroxybenzenepropanoic acid, 2,2-bis[[3-[3,5-bis(1,1-dimethylethyl)-4-hydroxyphenyl]-1-oxopropoxy]methyl]1,3-propanediyl ester sold under the trade name Irganox 1010 made by Ciba-Geigy, with an optimal concentration ranging from 0.05%–2.0% of the tie layer.

Additionally, the tie layer can include or be filled with from 0–60 wt % inorganic fillers, preferably from 15–30 wt %. Representative of fillers are calcium carbonate, clay, titanium dioxide and silica. The fillers enhance the stiffness and heat stability of the tie layer and thereby the entire bilayer layer coating structure.

The unique tie material was tested and compared against the EMA tie layer of the U.S. Pat. No. 4,455,184 as to cooking performance.

| Cooking Method | EMA-PET | EMA & Antioxidant-PET |
| --- | --- | --- |
| Gas Oven, 375° F. 30 minutes with frozen chili meal | Fail | Pass |

The structure embodied by the present invention was superior to the existing structure and passed the cooking performance requirements for dual ovenable board.

The coated board can be converted into many different types of packaging containers such as dual ovenable trays, eat-in-boxes, and gable-top cartons.

It is further possible, if desired, to coat the uncoated exterior of the paperboard substrate with suitable thermoplastic polymers. Such can be followed with printing onto the structure.

The basis weight of the paperboard can vary from 80 lbs/3,000 sq. ft. to 380 lbs/3,000 sq. ft., with a preference of (140–280 lbs)/3,000 sq. ft.

Applying both tie layer and product contact layer to the substrate can be achieved by either coextrusion coating both layers onto paper or lamination of biaxially oriented product contact layer in a film onto paper using a tie layer by standard lamination or extrusion lamination processes.

The use of new and unique higher melting adhesive tie material provides heat stability and strength additives and is a significant advance over the existing polyethylene terephthalate structures made with ethylene-methyl acrylate alone, thereby achieving the necessary high temperature end-use performance and cost savings required.

It is understood that the invention is not confined to the particular embodiments described herein, but embraces all modified forms thereof which come within the scope of the claims.

We claim:

1. A dual ovenable laminate structure comprising:
    a) a paperboard substrate;
    b) an extrudable tie layer consisting of ethylene-methyl acrylate copolymer and an antioxidant in a concentration ranging from 0.05–2.0%; and
    c) a product contact layer of polyethylene terephthalate.

2. A dual ovenable laminate structure as claimed in claim 1, wherein said extrudable tie layer has incorporated therein an inorganic filler in an amount up to 60% of said layer to enhance stiffness and heat stability of said layer.

3. A dual ovenable laminate structure as claimed in claim 1, wherein said antioxidant is a hindered phenol compound.

4. A dual ovenable laminate structure as claimed in claim 3, wherein the hindered phenol is 3,5-bis(1,1-Dimethylethyl)-4-hydroxy-benzenepropanoic acid, 2,2-bis[[3-[3,5-bis(1,1-dimethylethyl)-4-hydroxyphenyl]-1-oxopropoxy]methyl]1,3-propanediyl ester.

5. A dual ovenable laminate structure as claimed in claim 1, wherein said tie layer has a coating weight of from 1–30 lbs/3,000 sq. ft.

6. A dual ovenable laminate structure as claimed in claim 1, wherein said product contact layer has a coating weight of from 4–35 lbs/3,000 sq. ft.

7. A dual ovenable container constructed from a laminate structure comprising:
    a) a paperboard substrate;
    b) an extrudable tie layer consisting of ethylene-methyl acrylate copolymer and an antioxidant in a concentration ranging from 0.05–2.0%; and
    c) a product contact layer of polyethylene terephthalate.

8. A dual ovenable container constructed from a laminate structure as claimed in claim 7, wherein said extrudable tie layer has incorporated therein an inorganic filler in an amount up to 60% of said layer to enhance stiffness and heat stability of said layer.

9. A dual ovenable container constructed from a laminate structure as claimed in claim 7, wherein said antioxidant is a hindered phenol compound.

10. A dual ovenable container constructed from a laminate structure as claimed in claim 9, wherein the hindered phenol is 3,5-bis(1,1-Dimethylethyl)-4-hydroxy-benzenepropanoic acid, 2,2-bis[[3-[3,5-bis(1,1-dimethylethyl)-4-hydroxyphenyl]-1-oxopropoxy]methyl]1,3-propanediyl ester.

11. A dual ovenable container constructed from a laminate structure as claimed in claim 7, wherein said tie layer has a coating weight of from 3–30 lbs/3,000 sq. ft.

12. A dual ovenable container constructed from a laminate structure as claimed in claim 7, wherein said product contact layer has a coating weight of from 4–35 lbs/3,000 sq. ft.

* * * * *